United States Patent [19]
Fushimoto et al.

[11] Patent Number: 4,517,660
[45] Date of Patent: May 14, 1985

[54] FOLDABLE ELECTRONIC APPARATUS

[75] Inventors: Hideo Fushimoto; Shigeru Toyomura, both of Kawasaki; Yoshiaki Nishimuro, Hachiohji; Osamu Asakura; Masahiro Rachi, both of Tokyo, all of Japan

[73] Assignee: Canon Kabushiki Kaisha, Tokyo, Japan

[21] Appl. No.: 490,550

[22] Filed: May 6, 1983

Related U.S. Application Data

[63] Continuation of Ser. No. 244,258, Mar. 16, 1981, abandoned.

[30] Foreign Application Priority Data

Mar. 27, 1980 [JP] Japan .................................. 55-39249
May 14, 1980 [JP] Japan .................................. 55-62750

[51] Int. Cl.³ .......................... G06C 7/02; G06F 3/02
[52] U.S. Cl. .................... 364/708; 200/5 A; 340/365 R; 340/365 S; 364/709
[58] Field of Search ............................... 364/708, 709; 340/365 R, 365 S; 200/5 A, 159 B

[56] References Cited

U.S. PATENT DOCUMENTS

| | | | |
|---|---|---|---|
| 3,772,597 | 11/1973 | Stover | 340/365 S X |
| 3,940,758 | 2/1976 | Margolin | 364/708 X |
| 4,075,702 | 2/1978 | Davies | 364/705 |
| 4,096,577 | 6/1978 | Ferber et al. | 364/708 X |
| 4,117,542 | 9/1978 | Klausner et al. | 364/900 |
| 4,324,976 | 4/1982 | Lapeyre | 340/365 R X |
| 4,395,704 | 7/1983 | Kishimoto et al. | 340/365 S |

Primary Examiner—Jerry Smith
Assistant Examiner—Clark A. Jablon
Attorney, Agent, or Firm—Fitzpatrick, Cella, Harper & Scinto

[57] ABSTRACT

An electronic apparatus comprises a left-hand unit and a right-hand unit mutually connected to constitute a foldable structure, in which a display device is provided in one of the units while an aperture is provided in the other to enable observation of the display device even in the folded state of the apparatus. Operational keys are provided on the other unit or on both units to enable operation of the apparatus in the open and/or folded position thereof.

7 Claims, 7 Drawing Figures

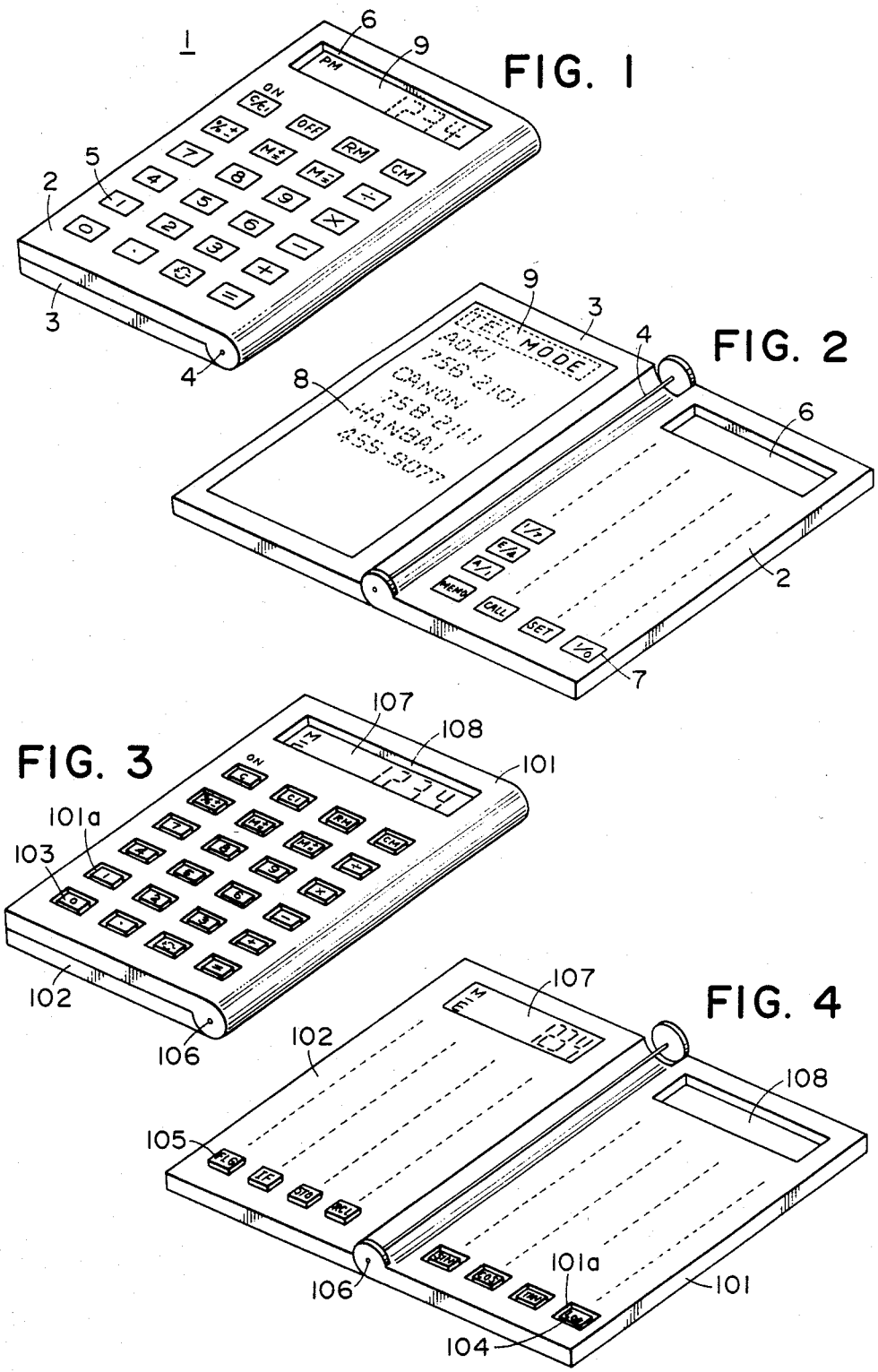

FOLDABLE ELECTRONIC APPARATUS

This application is a continuation of application Ser. No. 244,258 filed Mar. 16, 1981 now abandoned.

BACKGROUND OF THE INVENTION

1. Field of the Invention

The present invention relates to an electronic apparatus having a keyboard, and more particularly to an improvement in such apparatus having a foldable structure.

2. Description of the Prior Art

Conventional electronic apparatus such as electronic calculators are generally provided with plural key switches arranged on a plane, as input means, which increase in number in case of varied input information must be input such as in functional calculators or programmable calculators. Therefore, the calculators require a large keyboard that is often inconvenient for carrying.

Also the electronic calculators with a character display function have recently become very popular with the public and acquired the function of electronic memorandum or diary, with electronic display of various information.

The display devices of the segment type, being incapable of alphanumeric display, are generally inadequate for providing such a memorandum function which requires an increased amount of information display. For this reason, in such electronic apparatus, the display devices have been improved and are of the dot matrix type with a small dot pitch to enable alphanumeric display and to indicate the usual memorandum message by means of the increased number of dots.

In such electronic apparatus, for example an electronic calculator with memorandum function, portability is however an essential factor, so that the number of characters displayable on the dot-matrix display device is usually limited as the keyboard requires a considerable amount of space.

On the other hand the memorandum function requires a considerable number of characters for each message. For this reason there has been proposed a moving display, in which the message to be displayed is supplied, beginning with a leading character, to one end of the display device on a character by character basis. After characters comprising the message fill the available display spaces of the device, the displayed message is extinguished on a similar character by character basis from the one end of the display device whle characters comprising the message are added to the one end, thereby enabling the display of many characters. Display of the message in plural divided portions has also been proposed.

However, such display methods do not allow confirmation of entire message at one time, but require a certain time for message reading and thus present a danger of erroneous reading. There has therefore ben proposed a display method employing multi-row display device to display the entire message at the same time. Such a display device however requires a considerable area, limiting the space available for the keyboard for the entry or readout of memorandum messages or for performing calculator operation.

On the other hand the message entry also requires an increased number of keys such as alphabet keys. As a result such electronic apparatus with a memorandum function require large spaces both for the display and for the keyboard, and become excessively large for carrying and lose the most important advantage of apparatus of this sort.

In order to circumvent such drawback there is already proposed, for example as disclosed in the U.S. Pat. No. 4,395,704 of the present applicant, a foldable structure composed of a display unit and a keyboard unit which are foldably connected to be opened for use and closed for carrying.

Such known foldable apparatus is designed to be opened for observing the memorandum message but is provided with another segment-type display device exclusively for frequently used arithmetic calculations and time indication in a position observable even in the folded state of the apparatus. Such structure however requires large manufacturing costs, since it uses two separate display devices.

Also in case of an electronic calculator with many functional operations, there is required a quite large number of keys which inevitably increases the size of the calculator itself, thus leading to increased manufacturing cost and limiting the portability of the apparatus even if such keys can be accommodated in a foldable structure composed of two halves, one of which is provided with plural keys and the of which other is provided with a display device and remaining keys.

SUMMARY OF THE INVENTION

The object of the present invention is to provide a foldable electronic apparatus divided into a left-hand case and a right-hand case, wherein a first of the cases is provided thereon with a keyboard having plural keys while a second of the cases is provided thereon with a display device, and said first case is further provided with an aperture to enable the observation of the data displayed on said display device even when said first and second cases are in the folded state.

Another object of the present invention is to provide a foldable electronic apparatus divided into a left-hand case and a right-hand case, wherein a first or a second of the cases is provided thereon with a keyboard having plural keys manipulable in the open state of said first and second cases, and said second of the cases is provided thereon with a display device while said first case is provided with an aperture to enable the observation of the information displayed on said display device even when said first and second cases are in the folded state, and wherein said first case is further provided on the opposite face thereof with a keyboard having plural keys manipulable for data entry even in the closed state of said first and second cases.

Still another object of the present invention is to provide a foldable electronic apparatus divided into a left-hand case and a right-hand of the cases wherein a first case is provided on both faces thereof with keyboards each having plural keys, while a second of the cases, is provided thereon with a display device and another keybord having plural keys different from those on said first case, and said first case if further provided with an aperture for enabling the observation of the data displayed on said display device even in the folded state of said first and second cases.

Still another object of the present invention is to provide an electronic apparatus comprising a first case, a second case constituting a housing with said first case, a two-faced keyboard having plural keys manipulable from both faces of said first case for different data entries according to the pressing direction of said keys, and a display device provided on said housing for displaying the data entered by either of the keys of said two-faced keyboard or the processed data.

BRIEF DESCRIPTION OF THE DRAWINGS

FIG. 1 is a perspective view of a foldable electronic apparatus embodying the present invention and shown in a folded state;

FIG. 2 is a perspective view of said apparatus shown in an open state;

FIGS. 3 and 4 are perspective views of a foldable electronic calculator having a two-faced keyboard representing another embodiment of the present invention;

DESCRIPTION OF THE PREFERRED EMBODIMENTS

Figure 5:
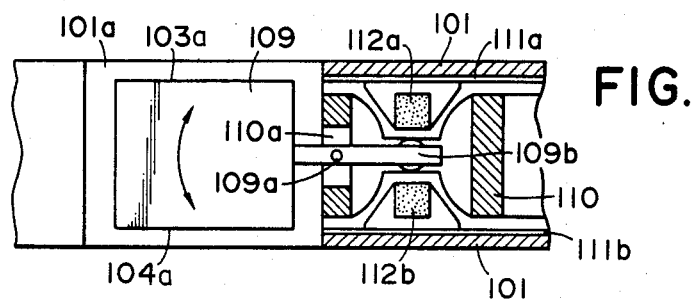
FIGS. 5 and 6 are partial magnified cross-sectional views of said two-faced keyboard.

Now the present invention will be explained in detail with reference to the embodiments thereof shown in the attached drawings.

FIGS. 1 and 2 are perspective views of a foldable electronic apparatus embodying the present invention, wherein an electronic calculator 1 is composed of a right-hand case 2 and a left-hand case 3 which are foldably connected along lateral edges thereof by a shaft 4, whereby said apparatus can be arbitrarily used in the folded state shown in FIG. 1 or in the open state shown in FIG. 2. The right-hand case 2 is provided, on the outer face thereof, with a keyboard 5, for example, for arithmetic calculations, and is further provided with an oblong rectangular aperture 6.

Said right-hand case 2 is further provided, on the inner face thereof, with a keyboard 7 for operating the apparatus to perform memorandum and clock functions. The keyboard 7 includes alphabet keys etc. omitted from the illustration.

The left-hand case 3 is provided with a large-size dot-matrix display device 8 of multi-row capability, of which a part 9 positioned to be viewed through said aperture 6 of the right-hand case 2 is designed for displaying the entered or processed data or for indicating time.

The apparatus of the foregoing embodiment can be used as an ordinary calculator in the closed or folded state shown in FIG. 1 wherein the entered or processed data or the time can be observed through the aperture 6.

On the other hand, for the observation or entry of memorandum messages, the cases 2, 3 are opened as shown in FIG. 2 and the memorandum keyboard 7 is manipulated, to thus read the memorized message on the display device 8 or enter new messages.

FIGS. 3 and 4 are perspective views of a foldable electronic calculator representing another embodiment of the present invention, which is usable as an ordinary calculator in a folded state shown in FIG. 3 and as a programmable calculator in an open state shown in FIG. 4, wherein many keys 104, 105 for program entry, most of which are omitted in FIG. 4, are arranged on both open faces.

More specifically the calculator of the present embodiment is composed of a right-hand case 101 and a left-hand case 102 foldably interconnected by a shaft 106, wherein said right-hand case 101 is provided on the outer face thereof with a keyboard 103 for ordinary arithmetic calculations and with a display aperture 108. The key tops 109 of said keyboard 103 constitute, as shown in FIG. 5, also a keyboard 104 for programmed calculations on the opposite face. Also the left-hand case 102 is provided with a keyboard 105 for programmed calculations and a display device 107 for displaying the entered and processed data, in a position to be viewed through said display aperture 108. Inside said cases 101, 102 there are provided unrepresented electronic circuits for data processing.

The ordinary arithmetic calculations can be executed through the keyboard 103 while the cases 101, 102 are in the folded state as shown in FIG. 3, wherein the entered or processed data are displayed on the display device 107 of the case 102 and rendered observable through said aperture 108 in the corresponding position.

In case of the use as a programmable calculator, the cases 101, 102 are opened about the shaft 106 as shown in FIG. 4, wherein the calculations are executed through the keyboards 104, 105 on the cases 101, 102 and the entered or processed data are displayed on the display device 107.

The two-faced keyboard as mentioned above should preferably be as thin as possible in consideration of the portability of the calculator, and the protruding height of key tops should be as small as possible for reducing the thickness in the folded state.

Figure 6:
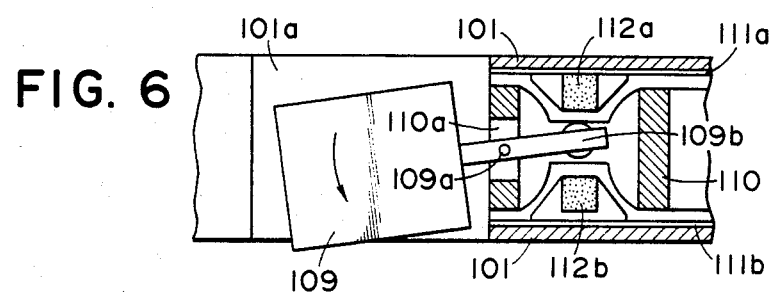
Figure 7:
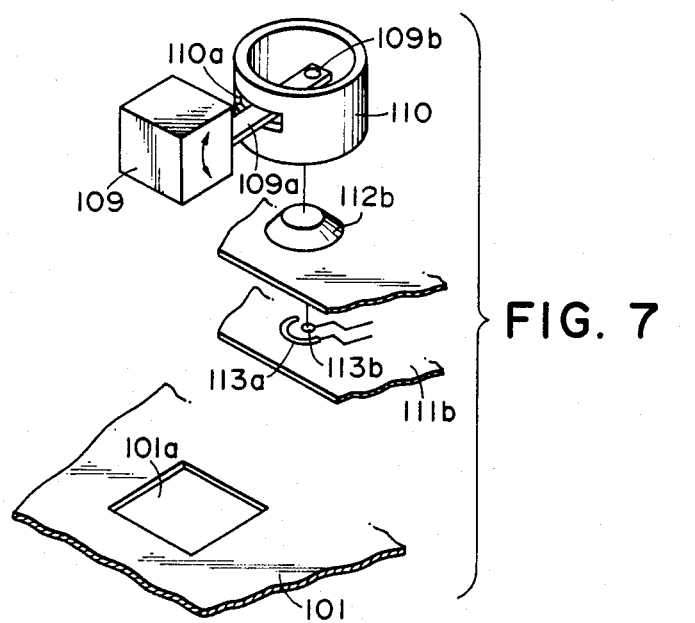
FIG. 7 is an exploded perspective view of a portion of said two-faced keyboard.

FIGS. 5, 6 and 7 show a keyboard structure satisfying these requirements.

Corresponding to each key top position the case 101 is provided with an aperture 101a slightly larger than a key top 109, which on both surfaces thereof are printed to indicate a key data 103a, 104a. Said key top 109 is fixed to a key shaft 109b, which is inserted through an aperture 110a of a cylindrical member 110 and supported, rockably in the direction of arrow, by a shaft 109a. Inside said case 101 there are provided printed circuit boards 111a, 111b having circuit patterns for key signal processing and further provided with elastic electroconductive members 112a, 112b for example electroconductive rubber contacts corresponding to each key position, whereby said electroconductive rubber contact 112a or 112b, when depressed, shortcircuits circuit patterns 113a and 113b on said circuit board 111 thereby completing a key entry operation. Said cylindrical member 110 rockably supporting said key top 109 is supported in the case 101 to maintain said key top 109 in the vicinity of the center of the said aperture 101a as shown in FIG. 5. Upon downward depression of said key top 109 as shown in FIG. 6, the key shaft 109b rotates about the key shaft 109a, pressing upwardly the conductive rubber contact 112a to complete a circuit on the patterns of the printed circuit board 111a. Also when case the cases 101, 102 are opened in use, a downward depression of the key top 109 causes the depression of the rubber contact 112b, thus completing a circuit on the printed circuit board 111b. In this manner key entries from both faces can be achieved by a single key top.

What we claim is:

1. A foldable electronic apparatus comprising:
   housing means having a first case and a second case mutually connected in a foldable manner to be moved between open and folded positions;
   first keyboard means comprising a plurality of keys mounted on at least one of said first case and said second case and actuatable from a top surface thereof when said housing means is in the open position for entering data into said apparatus;

second keyboard means comprising a plurality of keys, used for a different purpose from that of said first keyboard means, provided on and actuatable from a top surface of said first case when said housing means is in the folded position;

display means provided on a top surface of said second case to display data entered by actuation of said keys of said first keyboard means and said second keyboard means and data obtained by processing said entered data; and means providing a display aperture in said first case for enabling visual display of data entered through said second keyboard means and processed data to be displayed on said display means when said housing means is in the folded position.

2. A foldable electronic apparatus according to the claim 1, wherein said display means comprises a first display area in a position viewable through said aperture when said housing is in the folded position and a second display area in a position not viewable through said aperture.

3. A foldable electronic apparatus comprising:
housing means having a first case and a second case mutually connected in a foldable manner for movement between open and folded positions;

first keyboard means comprising a plurality of keys mounted on at least one of said first case and said second case and actuatable from a top surface thereof when said housing means is in the open position for entering character data into said apparatus;

second keyboard means comprising a plurality of numerical keys and function keys provided on and actuatable from a top surface of said first case when said housing means is in the fiolded position;

display means provided on a top surface of said second case to display character data entered through said first keyboard means and numerical data entered through said second keyboard means; and means providing a display aperture, for enabling numerical data and processed data entered through said second keyboard means to be visually displayed on a portion of said display means, provided in said first case in a position through which said portion of said display means can be viewed when said housing means is in the folded position.

4. A foldable electronic apparatus according to the claim 3, wherein said display means is a dot matrix display device.

5. A two-faced keyboard apparatus, comprising:
housing means having a first exposed surface, a second exposed surface opposite said first exposed surface, and predetermined thickness defined between said first and said second exposed surfaces; said housing means further being formed with hole means extending therethrough in the direction of the predetermined thickness thereof;

key top means disposed within said hole means for movement in the direction of the predetermined thickness of said housing means, to be actuated from both of said first exposed surface and said second exposed surface of said housing means; and key signal generating means for generating a key signal in response to movement of said key top means by actuation from either of said first and said second exposed surfaces.

6. A two-faced keyboard apparatus according to claim 5, wherein said key signal generating means comprises a first key signal generator for generating a first key signal in response to actuation of said key top means from said first exposed surface to cause movement of said key top means toward said second exposed surface, and a second key signal generator for generating a second key signal in response to actuation of said key top means from said second exposed surface to cause movement of said key top means toward said first exposed surface.

7. A two-faced keyboard apparatus according to claim 5, further comprising a second housing means connected to said housing means in a foldable manner and a second key top means disposed in said second housing means.

* * * * *